United States Patent

Higgs et al.

(10) Patent No.: US 10,664,276 B2
(45) Date of Patent: May 26, 2020

(54) REMOTE COMMAND INVOCATION USING A REGISTER FOR STORING A COMMAND AND AN ATTENTION BIT INDICATING COMMAND HAS BEEN ISSUED

(71) Applicant: International Business Machines Corporation, Armonk, NY (US)

(72) Inventors: Raymond M. Higgs, Poughkeepsie, NY (US); Luke M. Hopkins, Peterborough, NH (US); Mushfiq U. Saleheen, Poughkeepsie, NY (US); Gabriel M. Tarr, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 15/278,265

(22) Filed: Sep. 28, 2016

(65) Prior Publication Data

US 2018/0088950 A1 Mar. 29, 2018

(51) Int. Cl.
*G06F 9/38* (2018.01)
*G06F 15/82* (2006.01)
*G06F 9/30* (2018.01)
*G06F 13/16* (2006.01)
*G06F 9/54* (2006.01)

(52) U.S. Cl.
CPC ........ *G06F 9/30123* (2013.01); *G06F 9/3877* (2013.01); *G06F 9/547* (2013.01); *G06F 13/16* (2013.01); *G06F 15/82* (2013.01)

(58) Field of Classification Search
CPC .............................. G06F 9/3877; G06F 15/82
See application file for complete search history.

(56) References Cited

U.S. PATENT DOCUMENTS

| | | | | |
|---|---|---|---|---|
| 5,968,143 A | * | 10/1999 | Chisholm | ............. G06F 13/126 710/23 |
| 6,115,763 A | | 9/2000 | Douskey et al. | |
| 7,386,636 B2 | | 6/2008 | Day et al. | |
| 7,765,543 B1 | * | 7/2010 | Weissman | ............... G06F 9/485 714/48 |
| 2003/0033588 A1 | * | 2/2003 | Alexander | ................ G06F 9/54 717/107 |
| 2005/0066080 A1 | | 3/2005 | Duckman | |
| 2006/0129852 A1 | * | 6/2006 | Bonola | ................. G06F 1/3203 713/300 |

(Continued)

*Primary Examiner* — Jyoti Mehta
(74) *Attorney, Agent, or Firm* — Cantor Colburn LLP; Steven Chiu

(57) ABSTRACT

Technical solutions are described for a supervisory processor to pass an out-of-band communication to a target processor in a multiprocessor system. For example, a first processor in a multi-processor system includes a register configured to store a command from a second processor of the multi-processor system, and to store a response to the command from the second processor. The first processor determines that the second processor has issued the command for execution by the first processor based on a first portion of the register being set to a first state, which is a predetermined state. The first processor also, responsively, reads the command from the second processor by parsing a second portion of the register. The first processor includes executes the command and stores the response for the command in the register.

5 Claims, 4 Drawing Sheets

(56) References Cited

U.S. PATENT DOCUMENTS

| | | | |
|---|---|---|---|
| 2007/0255776 A1* | 11/2007 | Iwai | G06F 9/30098 |
| | | | 708/200 |
| 2009/0172299 A1* | 7/2009 | Goodman | G06F 9/466 |
| | | | 711/147 |
| 2011/0035537 A1* | 2/2011 | Kwon | G06F 15/167 |
| | | | 711/103 |
| 2015/0253832 A1 | 9/2015 | Nishimoto et al. | |
| 2018/0004581 A1* | 1/2018 | Brown | G06F 13/28 |

* cited by examiner

REMOTE COMMAND INVOCATION USING A REGISTER FOR STORING A COMMAND AND AN ATTENTION BIT INDICATING COMMAND HAS BEEN ISSUED

BACKGROUND

The present application relates to computer technology, and more specifically, to multi-processor technology.

The ever-increasing demand for computing power has driven computer architectures toward multiprocessor or parallel-processor designs. While uniprocessors are limited by component and signal speed to processing only a few instructions simultaneously, a multiprocessor contains multiple independent processors, which can execute multiple instructions in parallel, substantially increasing processing speed. A group of processors within the multiprocessor can be defined as a node or cluster where each processor of the node executes instructions of one or a few processes to enable efficient, parallel processing of those processes. Some advanced multiprocessors contain multiple nodes and assign processes to different nodes in the system to provide parallel processing of multiple processes. Alternatively or in addition, the multiprocessors facilitate execution of a single process across multiple processors in the system.

Intercommunication between the multiple processors of the multiprocessor system is crucial for accurate execution of the process(es). For example, a versatile multiprocessor must be able to distribute subtasks in a number of ways, ascertain the status of the processors performing the subtasks, merge and sort messages, correct and revise data, and ascertain when and how resources have changed (as when processors fail or come online).

SUMMARY

According to one or more embodiments, a first processor in a multi-processor system includes a register configured to store a command from a second processor of the multi-processor system, and to store a response to the command from the second processor. The first processor determines that the second processor has issued the command for execution by the first processor based on a first portion of the register being set to a first state, which is a predetermined state. The first processor also, responsively, reads the command from the second processor by parsing a second portion of the register. The first processor includes executes the command and stores the response for the command in the register.

According to one or more embodiments, a computer implemented method for facilitating an external processor to invoke a remote execution of a command by a target processor includes determining, by the target processor, that the external processor has issued the command based on a first portion of a register being set to an attention state, which is a predetermined state. The computer implemented method also includes responsively, reading, by the target processor, the command by parsing a second portion of the register. The computer implemented method also includes storing, by the target processor, a response for the command in the second portion of the register.

According to one or more embodiments, a computer program product for facilitating an external processor to invoke a remote execution of a command by a target processor includes a computer readable storage medium. The computer readable storage medium includes computer executable instructions to determine, by the target processor, that the external processor has issued the command based on a first portion of a register being set to an attention state, which is a predetermined state. The computer readable storage medium also includes computer executable instructions to responsively, read, by the target processor, the command by parsing a second portion of the register. The computer readable storage medium also includes computer executable instructions to store, by the target processor, a response for the command in the second portion of the register.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
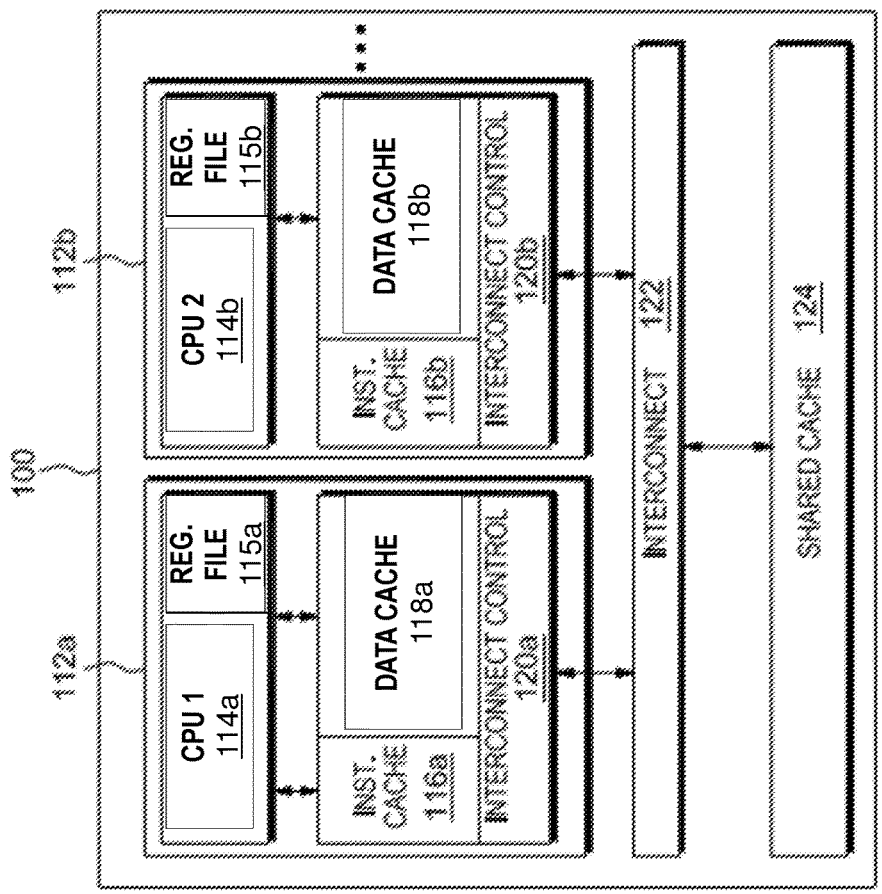
FIG. 1 depicts a multiprocessor system, in accordance with one or more embodiments.

Technical solutions described herein facilitate an execution unit in a multiprocessor system to issue an out of band command to another execution unit and receive a response using a dual port register that is on each execution unit of the multiprocessor system. The execution unit may be a processor core, a processor, processing element, or any other such component that executes computer-executable instructions. For example, the execution unit may include a central processing unit, (CPU), a digital signal processor (DSP), a floating point unit (FPU), an arithmetic logic unit (ALU), or any other such processing unit. The dual port register may be part of a processor of the multiprocessor system the dual port register can be written into by the processor itself as well as an external processor, which is another processor of the multiprocessor system.

In one or more examples, the external processor is a 'supervisory processor' that sends command(s) to, and receives corresponding response(s) from target processors in a multiprocessor complex without interfering with the resources that are used to communicate between the processors of the multiprocessor complex. In one or more examples, there is a single external processor communicating with a group of target processors, because there is no synchronization between external processors associated with the multiprocessor complex. The technical solutions described herein facilitate an out of band communication path for the external (supervisory) processor to communicate with the target processors, thus simplifying the design of the multiprocessor complex and permits commands to be exchanged between the supervisor and target processors, without interfering with the dataflow between the target processors in the complex.

Although multiprocessors typically enhance the performance of a computer system, the multiple processors also create technical problems, such as managing multiple processors accessing a shared resource at the same time, and intercommunication between the processors. Such communication is typically implemented using queues of messages contained in a common memory space. The method of communication should provide for messages to be sent reliably and with as little interference as possible with or between other elements that may also be sending or receiving messages.

Further yet, in multiprocessor systems, a processor may issue a single out of band command to another processor and receive a response. Data flow in the multiprocessor is frequently queue driven, which faces the technical problems described earlier.

The technical solutions described herein address the technical problems above by using a dual port register. The technical solutions described herein further use a communication interface, such as a device control register (DCR) bus, a POWERPC™ interface, or the like to facilitate an external processor to communicate with the dual port register of one or more target processors of the multiprocessor complex. The technical solutions described herein use fewer resources and are orthogonal to all queuing activities in comparison to the typical solutions of using queues. Further, to maintain responsiveness, the technical solutions also incorporate the ability for the target processor to be able to recognize the presence of an out of band command when the target processor enters a wait state. As such, the technical solutions are rooted in and/or tied to computer technology in order to overcome a problem specifically arising in the realm of computers, specifically multiprocessor systems.

FIG. 1 depicts a multiprocessor system 100. The multiprocessor system 100 may be used in a server computer, a desktop computer, a laptop computer, a tablet computer, a smartphone, or any other computing system. The multiprocessor system 100 includes multiple processing cores 112A and 112B connected with an interconnect 122, which is connected to a shared cache 124. In another example, the multiprocessor system 100 includes a different number of cores than illustrated. Each processing core of the multiprocessor system 100 may be a transactional processor. Each core 112A and 112B includes a processor, such as a central processing unit (CPU) 114A and 114B. Each of the processors 114a and 114b may be a central processing unit, an application-specific integrated circuit (ASIC), a digital signal processor, a field programmable gate array (FPGA), a digital circuit, an analog circuit, or combinations thereof. In an example, the processors 114a and 114b are on a single die. In an example, each processor includes instructional caches 116a-116b, data caches 118a-118b, and interconnect controls 120a-120b, to support transactional memory operations.

The processor cores 112a and 112b further include register files 115a and 115b respectively. The register files 115a and 115b include multiple registers that the CPUs 114a and 114b use during execution of one or more computer executable instructions. In one or more examples, the register file 115a includes one or more dual port registers. A dual port register facilitates two or more processor cores to access the register. For example, a dual port register of the processor core 112a can be written into by the processor core 112a and the processor core 112b.

Figure 2:
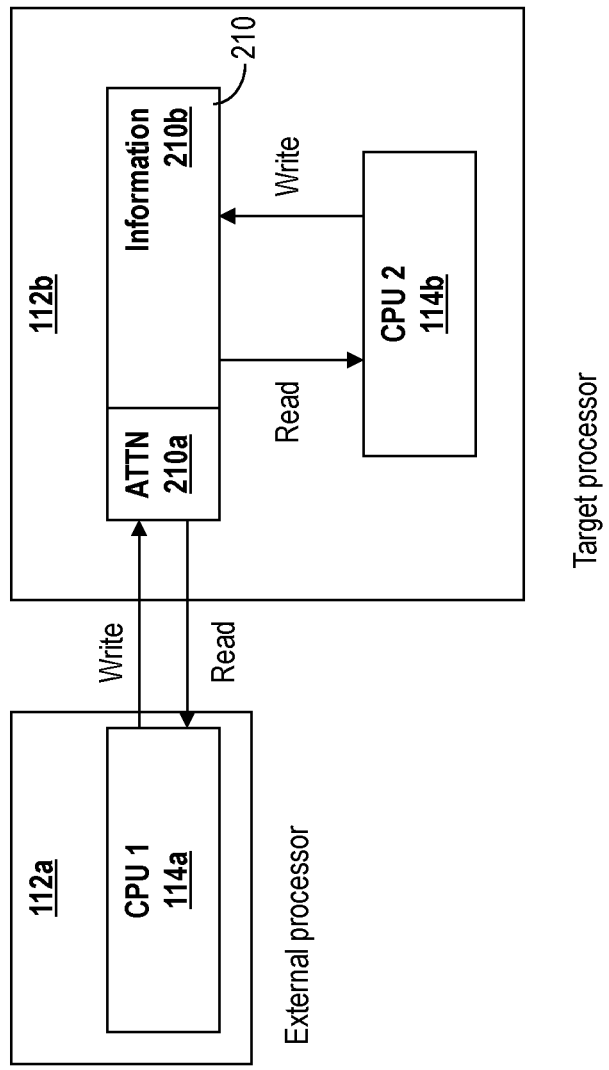
FIG. 2 illustrates an example in which an external processor core issues a command for execution by a target processor core, in accordance with one or more embodiments.

FIG. 2 illustrates an example in which the processor core 112a is an external processor core that issues a command for execution by the processor core 112b, which is a target processor core in this case. It is understood that any processor core of the multiprocessor system 100 may be the target processor core and/or external processor core. In one or more examples, the external processor core 112a may be a supervisor processor core in the multiprocessor system 100. The external processor core 112a may supervise the operations of all other processor cores in the multiprocessor system 100, or a subset of the other processors.

The target processor has a dual port register 210 that may be read or written at any time by both, the target processor 112b (that contains the register), and the external processor core 112a. Further, the external (supervisory) processor core 112a may use a communication bus, such as the POWERPC™ DCR bus to write into the dual port register 210 of the target processor core 112b. In one or more examples, only the external processor core 112a is enabled to write to and read from the DCR bus. The DCR bus may connect the external processor core 112a to one or more target processor cores of the multiprocessor system 100. Accordingly, the external processor core 112a can communicate with the target processor core 112b using the dual port register 120 as described herein.

According to one or more examples of the technical solutions described herein, the dual port register 210 includes a first portion, which is a subset of bits of the register, and which is designated as an attention portion 210a. The remaining bits, designated as an information portion 210b, are used for passing information to the target processor 112b. In one or more examples, the attention portion 210a may be one of the bits in the register 210, designated as an attention bit.

Figure 3:
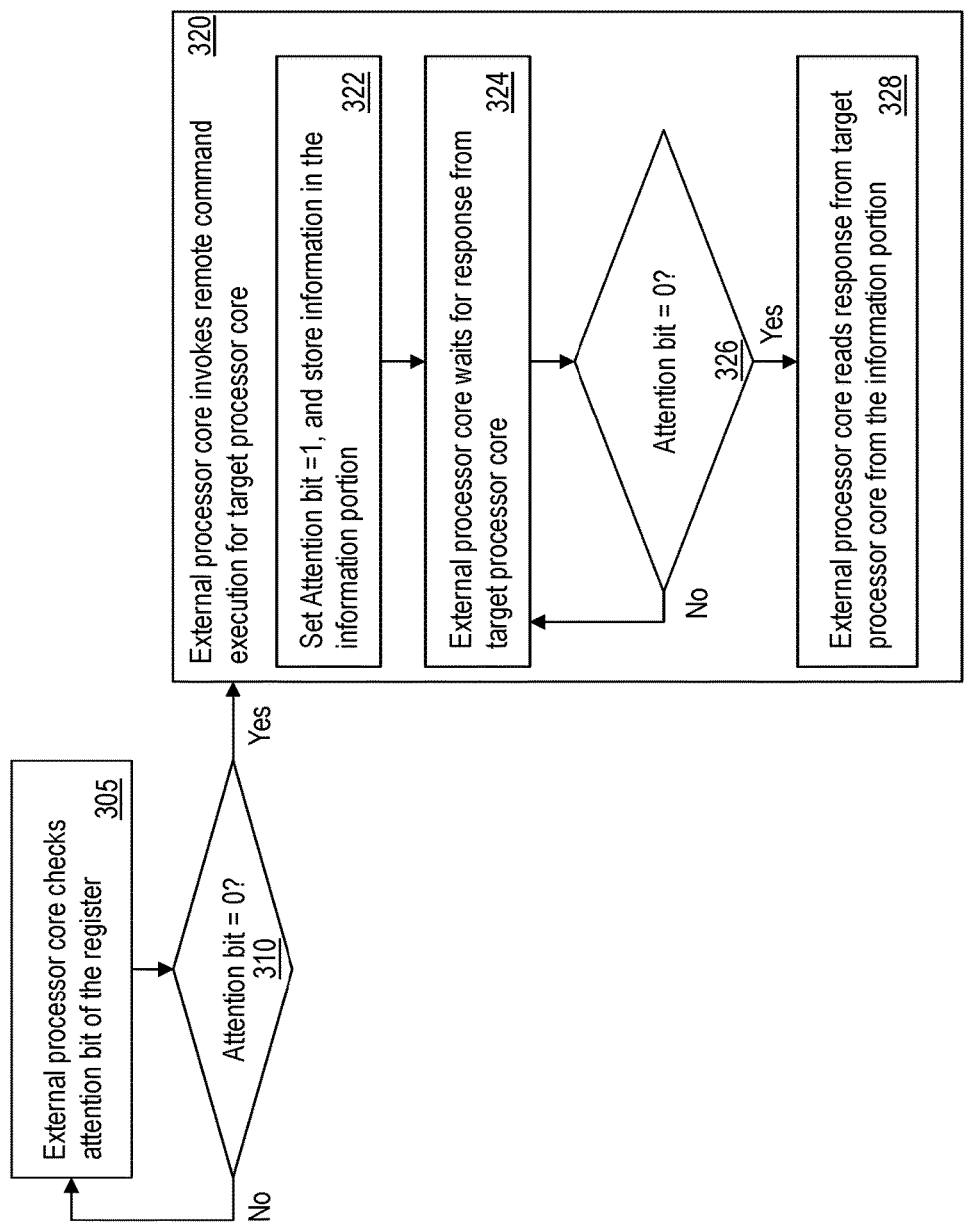
FIG. 3 illustrates a flowchart for a method for an external processor to remotely invoke a command for execution by a target processor, in accordance with one or more embodiments.

FIG. 3 illustrates a flowchart for a method for passing information between the external processor core 112a and the target processor core 112b. In this case, the information passed is the command from the external processor core 112a. The method provides a predetermined protocol for the processor cores 112a and 112b to use for passing information between each other using the register 210. The example described here uses an attention bit, that is, a single bit in the attention portion 210a; however, it is understood that other examples may use additional number of bits.

The method illustrated in FIG. 3 depicts operations performed by the external processor core 112a. In this example, the external processor core 112a transmits a command to the target processor core 112b. The external processor core 112a checks the attention bit of the register 210 of the target processor core 112b, as shown at block 305. If the attention bit is 0, the external processor core 112a has write ownership of the register 210, as shown at block 310. It is understood that in other examples, the attention bit values may be reversed from those used in the example herein. The external processor core 112a invokes remote command execution for target processor core 112b, as shown at block 320. In one or more examples, the external processor core 112a invokes the remote execution by using a DCR write command to set the attention bit in the dual port register 210 of the target processor core 112b. In one or more examples, the target processor core 112b issues a Wait instruction to wait for a command to be written by the external processor core 112a into the information portion 210b. Typically, the target processor core 112b uses the Wait instruction for waiting for multiple events, like data arriving on queues. In this case, the target processor core 112b uses the Wait instruction based on the attention bit in the dual port register 210. Table 1 below depicts an example format of the Wait instruction.

TABLE 1

| WTEVENT Opcode | ... | Cmd Attn Mask Bit | ... |
| --- | --- | --- | --- |

For example, the Wait instruction includes a mask to identify the attention bit value to be set in the dual port register 210. Alternatively or in addition, if the target processor core 112b has executed a Wait instruction, the target processor core 112b uses a wait mask that identifies one or more events to check upon waking up. The wait mask includes checking the attention portion 210a of the dual port register 210. If the external processor core 112a has written to the attention portion 210a of the dual port register 210 during the wait state, the target processor core 112b wakes up from the wait state and determines the reason for awakening using the wait mask (if there are multiple wait events specified in the mask). If there is more than one event specified in the mask (like queue not empty and attention), the target processor core 112b checks if the attention portion 210a of the dual port register 210 is set to the predetermined state that is indicative that the remote command from the external processor core 112a is available.

The external processor core 112a thus issues the command remotely by writing the dual port register 210 with the attention bit set to 1 and the other bits are used to convey the command and corresponding parameters, as shown at block 322. In one or more examples, the external processor core 112a sets the information portion 210b (command) and the attention bit 210a in a single atomic write operation. Alternatively or in addition, setting the attention bit 210a is the last operation, subsequently performed after setting the information portion (command) 210b.

The external processor core 112a waits for a response from the target processor core 112b, as shown at block 324. In one or more examples, the external processor core 112a may proceed to execute a different process, or a different instruction while waiting for the target processor core 112b to complete execution of the remotely invoked command. If the attention bit is 1, the target processor core 112b that contains the register 210 has write ownership of the register 210. The target processor core 112b indicates completion of the command and provides the response by writing the register 210 with the attention bit set to 0 and the other bits are used to convey the response, as shown at block 326 and 328. That is, in other words, the external processor core 112a waits until the attention bit is set to 0, and upon that condition being met, reads the response from the remaining bits of the register 210, as shown at blocks 326 and 328.

Figure 4:
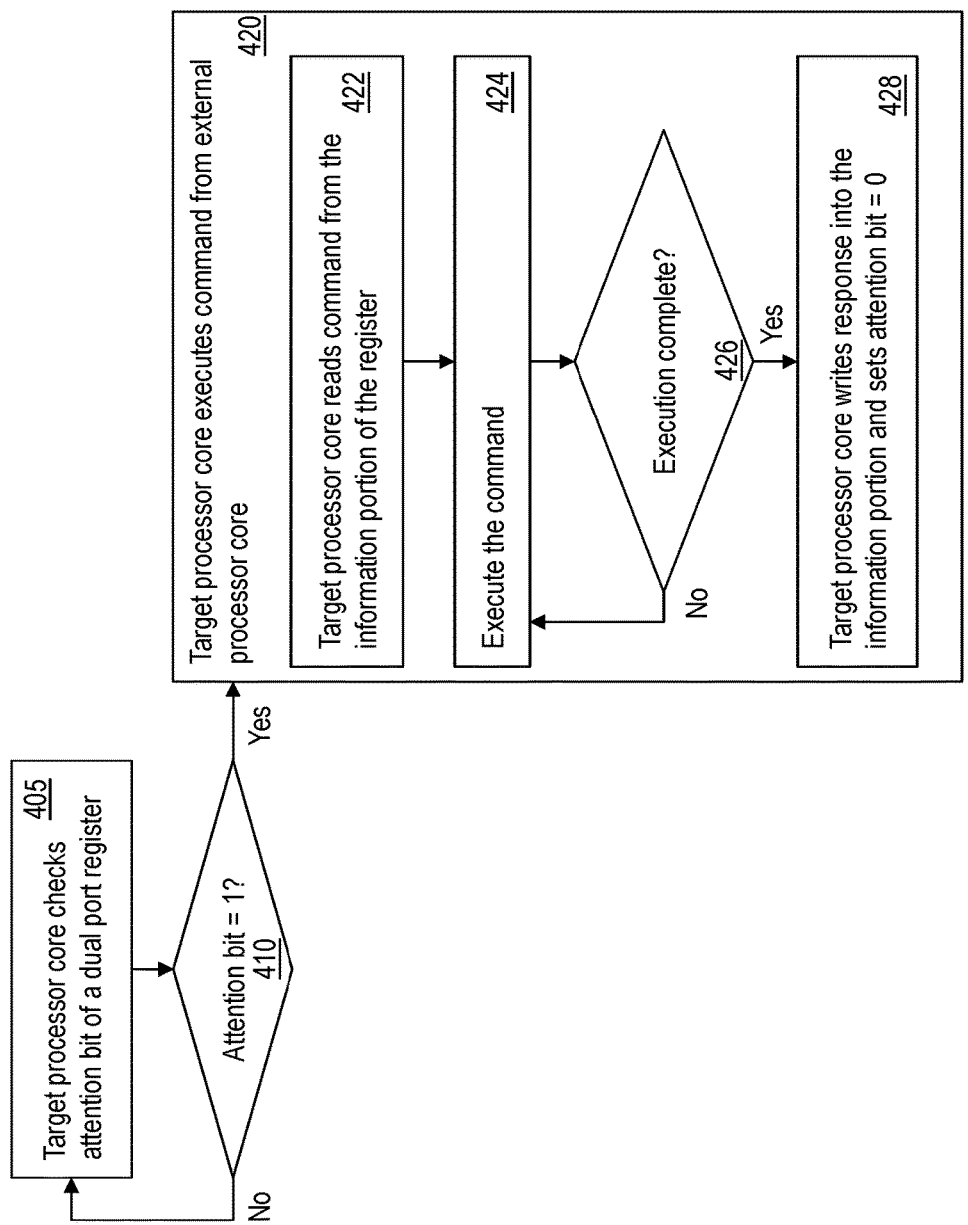
FIG. 4 illustrates a flowchart for a method for a target processor to execute a command issued by an external processor, in accordance with one or more embodiments.

FIG. 4 illustrates a flowchart for a method for passing information between the external processor core 112a and the target processor core 112b. The information may be a command for which the external processor core 112a desires to invoke a remote execution on the target processor core 112b. FIG. 4 illustrates the operations that the target processor core 112b performs. For example, the target processor core 112b checks attention bit of the dual port register 210 periodically, such as once every microsecond, once every 100 microseconds, or any other predetermined frequency, as shown at block 405. Alternatively or in addition, the target processor core 112b checks the attention bit. For example, the external processor core 112a directs a Write instruction using the DCR bus to the dual port register 210 of the target processor core 112b. In one or more examples, the Write instruction embeds the attention bit and command data for the dual port register 210. In one or more example, the Write instruction invokes the target processor 112b to issue a Wait instruction to wait for additional parts of the command from the external processor core 112a. For instance, the external processor core 112a issues a first part of the command to the target processor core 112b, and the target processor core 112b saves the first part. In one or more examples, the target processor core 112b produces a response to the first part. Alternatively or in addition, the target processor core 112b enters a wait state for a subsequent part of the command. Further, another part of the command is received from the external processor core 112a, which the target processor core 112b aggregates and enters another wait state until all parts of the command have been received and executed. In one or more examples, the subsequent parts may include one or more parameters for the command. The target processor core 112b thus executes the command that includes multiple parts or sub-commands, using a chaining technique described above.

If the attention bit is 1, it is indicative that the target processor core 112b has write ownership of the register 210, and further that the external processor core 112a has provided the command for remote execution. Accordingly, if the attention bit is 1, the target processor core 112b executes the command from the external processor core 112a, as shown at blocks 410 and 420.

For executing the command, the target processor core 112b reads the command from the information portion 210b of the register 210, as shown at block 422. In one or more examples, the target processor core 112b parses the command. The target processor core 112b executes the command, as shown at block 424. Once the command execution is complete, the target processor core 112b writes the response for the command into the information portion 210b and sets the attention bit to 0, as shown at blocks 426 and 428. In one or more examples, setting the information portion 210b (response) and setting the attention bit 210a is done as a single atomic write operation, at block 428. Alternatively or in addition, setting the attention bit 210a is the last operation, subsequently performed after setting the information portion (response) 210b, at block 428.

As described earlier, once the attention bit is 0, the external processor core 112a receives write ownership of the register 210, and in this case an indication that the response is ready for retrieval. In one or more examples, the target processor core 112b enters a wait state, where the target processor core 112b waits for further remote command invocations from the external processor core 112a. For example, the target processor core 112b executes a Wait instruction to enter the wait state.

Accordingly, the technical solutions described herein facilitate a processing core, which is a supervisory core, in a multiprocessing environment to issue an out of band command to another processing core, which is a target core, and receive a response using a dual port register that is on each target processing core (processor, processing element) of the multiprocessing environment.

The technical solutions described herein use fewer resources and are orthogonal to all queuing activities in comparison to the typical solutions of using queues. Further, to maintain responsiveness, the technical solutions also incorporate the ability for the target processing core to recognize the presence of an out of band command when the target execution unit enters a wait state based on the attention portion of the dual port register.

The external processor may execute a Wait instruction to wait for a response to the command from the target processor. The external processor issues a Write instruction that may set an attention portion of the dual port register of the target processor to a predetermined value that is indicative to the target processor that the remote invocation command is now available. In one or more examples, the target processor executes a Wait instruction to wait for additional command parameters from the external processor. Alternatively or in addition, if the target processor has executed a Wait instruction with a wait mask that includes the attention portion, and if the external processor has written to the attention portion of the register, the target processor wakes up from the wait state and determines the reason for awakening (if there are multiple wait events specified in the mask). If there is more than one event specified in the mask (like queue not empty and attention), the target processor checks if the attention portion of the register is set to the predetermined state that is indicative of the available command. The target processor proceeds to parse the command from the register and execute the command. Upon completion of the execution, the target processor stores the response back into the dual port register and sets the attention portion to a second predetermined value. The second predetermined value is indicative to the external processor that the response is available for retrieval. Accordingly, the external processor proceeds to retrieve the response from the remotely invoked and executed command from the dual port register of the target processor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A multi-processor system comprising: a first processor; and a second processor; wherein the first processor comprises:
    a register configured to store a command from the second processor of the multi-processor system, and to store a response to the command from the second processor; and
    wherein the first processor is configured to:
        determine that the second processor has issued the command for execution by the first processor based on a first portion of the register in the first processor being set to a first state, which is a predetermined state, by the second processor;
        based on the first portion of the register being set to the first state, read the command from the second processor by parsing a second portion of the register; and
        execute the command and store the response to the command in the register, wherein the first portion is a bit and the second processor executes a write command to wake up the first processor, and embeds the command and the first state in the write command.

2. The multi-processor system of claim 1, wherein the first state is indicative of the first processor having write ownership of the register.

3. The multi-processor system of claim 2, wherein a second state is indicative of the second processor having write ownership of the register of the first processor.

4. The multi-processor system of claim 1, wherein the first processor is further configured to:
    set the first portion of the register to a second state in response to recording the response to the command in the second portion of the register.

5. The multi-processor system of claim 1, wherein the first processor checks the first portion of the register in response to waking up from a wait command.

* * * * *